United States Patent

[11] 3,630,228

| [72] | Inventors | Albert H. Turner<br>East Hampton;<br>Charles R. Kleza, Wethersfield, both of Conn. |
|---|---|---|
| [21] | Appl. No. | 889,424 |
| [22] | Filed | Dec. 31, 1969 |
| [45] | Patented | Dec. 28, 1971 |
| [73] | Assignee | United Aircraft Corporation<br>East Hartford, Conn. |

[54] WATER REGULATOR AND CHECK VALVE FOR A JET ENGINE
7 Claims, 1 Drawing Fig.

[52] U.S. Cl. .................................................... 137/614.18,
    137/484.2, 137/503, 137/505.18
[51] Int. Cl. ................................................................ G05d 16/10
[50] Field of Search ............................................. 137/614.18,
    614.2, 613, 614.11, 455, 484.1, 484.4, 484.6, 501,
    494, 497, 503, 505.18, 505.2, 505.27, 505.29

[56] References Cited
UNITED STATES PATENTS

| 2,865,397 | 12/1958 | Chenault | 137/501 |
| 2,890,718 | 6/1959 | Smith | 137/614.2 |
| 3,103,950 | 9/1963 | Gulick | 137/494 |
| 3,168,902 | 2/1965 | Pearl | 137/501 |
| 3,333,599 | 8/1967 | Baker | 137/501 |
| 3,344,806 | 10/1967 | Schultz | 137/494 |

*Primary Examiner*—Herbert F. Ross
*Assistant Examiner*—William H. Wright
*Attorney*—Jack N. McCarthy ABSTRACT: A water regulator and check valve for a jet engine water injection system which is of a simple and uncomplex construction. The water regulator and check valve construction is of an uncomplex construction in that there is substantially one moving part within the regulator.

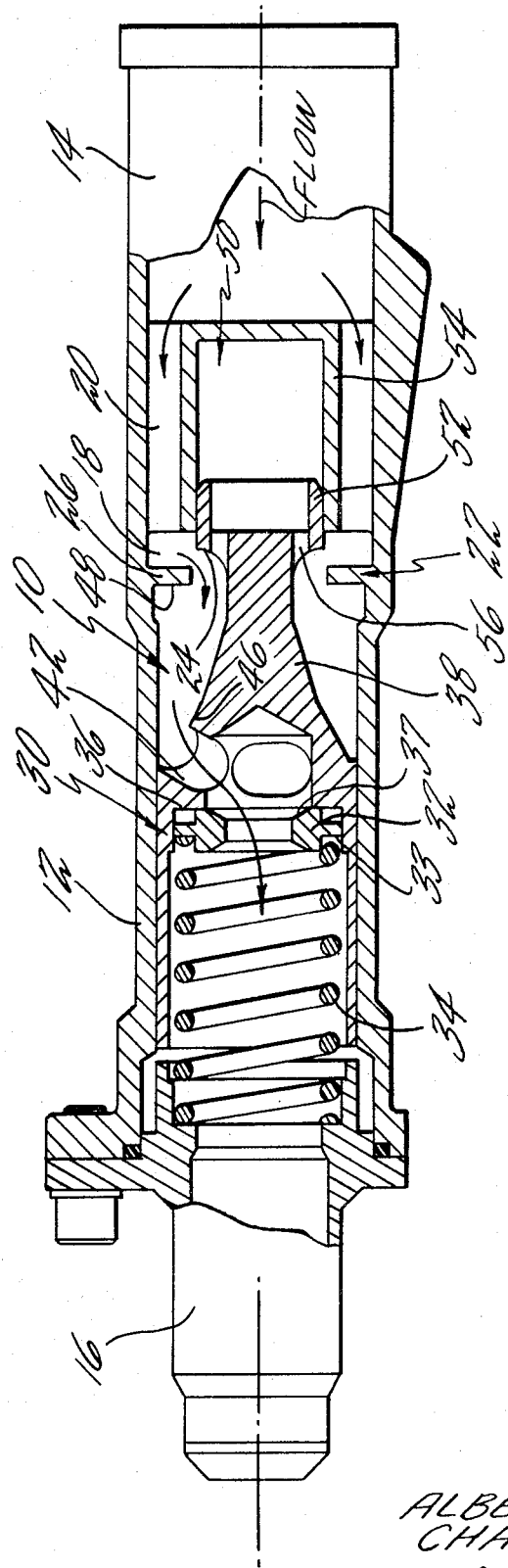

WATER REGULATOR AND CHECK VALVE FOR A JET ENGINE

BACKGROUND OF THE INVENTION

This invention relates to a water regulator and more particularly to a water regulator and check valve construction for use in a jet engine water injection system.

In the prior art, it is customary to use a water-regulating valve to supply water for the water injection system in a jet engine aircraft. The principal or fundamental concept that most prior art water regulators employ is that of having a fixed area or orifice across which the pressure drop is regulated. However, there are certain criteria which the water regulator must satisfy, these being a low-pressure drop, a minimum envelope for packaging of the water regulator, high-temperature capability when in the nonwater injection mode of operation, and low cost. The prior art water regulator constructions have been deficient in either several or all of the foregoing criteria.

More specifically, the water regulator of the present invention achieves low-pressure loss by nature of its straight through flow path construction. Additionally, the regulator of the present invention has high-temperature capability owing to its all metal construction, as opposed to the prior art regulators which have employed rubber diaphragms. Finally, the water regulator of the present invention achieves low cost through simplicity and fewer number of parts or internal structural members.

SUMMARY OF THE INVENTION

A primary object of the present invention is to provide a water regulator and check valve construction for a jet engine water injection system that is of a simple construction, contains a low-pressure drop, provides a minimum envelope for packaging, has a high-temperature capability when operating in the nonwater injection mode of operation and is of a low cost.

The foregoing objectives are accomplished by the construction of the present invention by employing a unitary construction which basically has only four structural members that effectively form one moving member. More specifically, the construction of the water regulator of the present invention utilizes a housing member with an inlet and outlet means, a resilient member, a metering orifice and a balance piston member. Additionally, the resilient member, orifice and balance piston member function or operate as a slidable unitary construction within the housing.

In operation, water enters the inlet means of a housing, flows therethrough and passes diagonally into an annulus of a throttle valve. The throttle valve in actuality is a pair of cooperating surfaces, one of which is fixed projection extending from the housing, the flow area through the throttle valve being controlled by the projection or surface on the balance piston. The balance piston which is located downstream of the throttle valve, carries both the metering orifice and the resilient member. The metering orifice and the resilient member, or more specifically the spring rate of the resilient member, are selected so that a predetermined pressure drop will exist across the metering orifice. Therefore, the water flowing through the throttle valve has a particular pressure, and if this pressure is too low, the resilient member and the balance piston operate or slide so as to increase the flow through the throttle valve. Conversely, if the pressure on the balance piston at the upstream side of the metering orifice is too high, the resilient member will cause the balance piston and resilient member to move so as to reduce the flow.

Additionally, the balance piston serves an additional function in that it is also a check valve. More specifically, the balance piston contains a flange member which cooperates with a flange or projecting member on the regulator housing. Therefore, one the water is shut off, the engine back pressure causes the balance piston to slide and causes the flange member to seat against the housing projection, therefore acting as a positive shutoff or a check valve.

BRIEF DESCRIPTION OF THE DRAWINGS

FIG. 1 is a fragmentary sectional illustration of the water regulator and check valve construction of the present invention.

DESCRIPTION OF THE PREFERRED EMBODIMENT

Referring now to the single figure, a water regulator and check valve construction, particularly adapted for use with a water injection system of a gas turbine engine, not shown, is illustrated. As shown, water regulator and check valve 10 include housing 12 which contains inlet means 14 and outlet means 16. In the normal embodiment, inlet means 14 would be connected to a water supply means and outlet means 16 would be connected to the appropriate gas turbine engine location.

Downstream of the inlet means 14 and providing a means of communication between annulus 18 and the inlet means 14 is passageway 20. Regulating and controlling the flow from annulus 18 is throttle valve 22. Throttle valve 22 comprises a flange 24 which is carried by balance position 30, hereinafter described in greater detail, and a projection 26 extending from housing 12, flange 24 and projection 26 cooperating to regulate and control the amount of water passing therethrough.

Positioned downstream of throttle valve 22 and arranged in series is balance piston 30, fixed metering orifice 32 and resilient member 34. By virtue of the construction hereinafter described, these three members cooperate and form a unitary construction. More specifically, balance piston 30 is slidable in an upstream and downstream direction within housing 12. Resilient member 34 is positioned against the downstream side 33 of orifice 32 and secures orifice 32 against flange 36 of balance piston 30. Flange 36 is positioned at the upstream side 37 of orifice 32, and is therefore exposed to the pressure upstream of orifice 32.

As has been stated hereinbefore, the balance piston 30, orifice 32 and resilient member 34 form a unitary construction and move as a unit. Another portion of this unitary construction is throttle valve 22. More specifically, throttle valve 22 includes flange 24 extending from connecting member 38 of balance piston 30. Therefore, any sliding movement of balance piston 30 is translated to throttle valve 22, thereby regulating the flow.

One of the principal objects of the present embodiment is to provide a constant flow of water to the engine independent of the pressure upstream or downstream of water regulator 10. The requirement for providing a constant flow arises from the necessity of not drawing the engine in one condition, i.e., supply too much water, and from the necessity of not burning up the engine in another condition, i.e., not enough water. To satisfy this requirement it is necessary to maintain a constant pressure drop across the orifice.

Therefore, one the pressure drop across the orifice is determined, the spring rate of the resilient member can be determined. More specifically, surface 42 and the upstream side 37 of orifice 32 are exposed to the throttled water pressure. If the pressure drop across orifice 32 is too great, the pressure exerted on these surfaces will cause the unitary construction to slide in a downstream direction. As a result of this sliding movement the flow will be decreased thus decreasing the pressure drop across the orifice. Similarly, if the pressure drop is too low the pressure exerted on these surfaces will be insufficient to overcome the force exerted by resilient means 34. As a result, the unitary construction of balance piston, fixed orifice, resilient member and throttle valve will be slid upstream, hence increasing the flow through throttle valve 22. If should be clear that the unitary construction is a floating member and is constantly modulating within housing 12.

As has been stated hereinbefore, it is a primary object to provide a constant flow of water independent of upstream pressure. To avoid any loads or forces being introduced or applied to throttle valve 22, a balanced throttle valve is utilized. More specifically, pressure may build up in dead-ended cylinder 50 as the result of water or fluid leaking between balance piston 52 and cylinder housing 54. To prevent this leakage, holes 56 are provided in balance piston 52 to provide a bleed path for the fluid that accumulates in cylinder 50. As a result the throttle valve 22 is balances and substantially insensitive to upstream pressure.

The construction of the regulator is very favorable from the standpoint of pressure loss through the regulation. This stems from the flow path of the water through the regulator. More specifically, water enters the regulator through inlet means 14, flows through passageway 20 and annulus 18. The water then passes through throttle valve 22, orifice 32 and exits through outlet means 16. As illustrated, the flow path through the regulator is not a tortuous path, the flow being substantially straight therethrough. Additionally, the inlet means 14 and the outlet means 16 are arranged in an in-line relationship to further maintain the flow path substantially straight through. More specifically, the centerlines of the inlet means and outlet means are concentric with or parallel to the centerline of the housing 12.

One final feature of the embodiment illustrated is that the balance piston 30 also serves as a check valve. As shown, balance piston 30 includes a check valve flange or surface 46. This flange or surface cooperates with a surface 48 on housing 12 so that when the water is shut off to inlet means 14, the engine back pressure and resilient means 34 combine to move the unitary construction in an upstream direction. The unitary construction moves upstream until surface 46 seats against surface 48 thereby preventing any back flow from the engine.

We claim:
1. A fluid regulator which provides a substantially constant flow rate independent of the pressures upstream and downstream of the regulator comprising;
a housing having an inlet and outlet means;
a throttle valve in the housing positioned downstream of the inlet means and in communication therewith;
said throttle valve comprising one member fixed to said housing and a second member movable in relation thereto to provide a valving action;
said housing having a piston member located downstream of said throttle valve;
said piston member being mounted for axial slidable movement therein;
means connecting the upstream end of said piston to the second movable member of said throttle valve;
opening means in said piston for permitting a flow of fluid which has passed said throttle valve to pass to the other side of said piston and flow to said outlet means;
a metering orifice in series with said opening means; and
spring means for biasing said piston, metering orifice, opening means and second movable member in an upstream direction.

2. A fluid regulator as set forth in claim 1 wherein:
the one member fixed to said housing is an annular flange projecting inwardly from the housing; and
the second member movable in relation thereto is connected to the forward end of said connecting means.

3. A fluid regulator as set forth in claim 2 wherein:
the second member is an outwardly extending flange mounted on the forward end of said connecting means.

4. A fluid regulator as set forth in claim 1 wherein:
said opening means extends through said connecting means.

5. A fluid regulator as set forth in claim 1 wherein:
said metering orifice is formed in a separate washerlike member;
said washerlike member being located between said spring means and the forward end of the piston.

6. A fluid regulator as set forth in claim 1 wherein:
a short cylindrical section is connected to and projects upstream of the outwardly extending flange connected to the forward end of said connecting means;
a cylindrical member being fixed in said housing upstream of said throttle valve, the upstream end of said cylindrical member being closed;
said short cylindrical section being slidably mounted in said cylindrical member; and
openings connecting the downstream side of said outwardly extending flange to the interior of said short cylindrical section.

7. A fluid regulator as set forth in claim 2 wherein:
said connecting means has a surface thereon for contacting the upstream side of said annular flange projecting inwardly from the housing providing a check valve when no pressure drop exists across the metering orifice.

* * * * *